(No Model.) 4 Sheets—Sheet 1.

A. W. TOURGEE & L. DE F. JENNINGS.
HARNESS.

No. 333,175. Patented Dec. 29, 1885.

Witnesses. Inventors.
Harry J. Rohrer Albion W. Tourgee + L. de F. Jennings,
J. H. Adriaans. By. Parker W. Sweet
Atty.

(No Model.) 4 Sheets—Sheet 2.

A. W. TOURGEE & L. DE F. JENNINGS.
HARNESS.

No. 333,175. Patented Dec. 29, 1885.

(No Model.) 4 Sheets—Sheet 3.
A. W. TOURGEE & L. DE F. JENNINGS.
HARNESS.
No. 333,175. Patented Dec. 29, 1885.
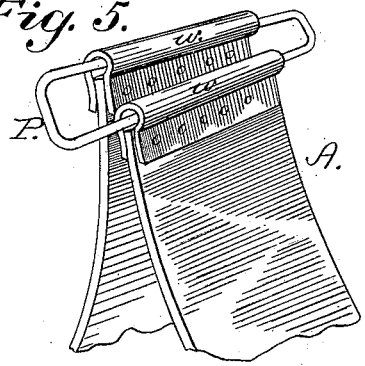
Fig. 5.
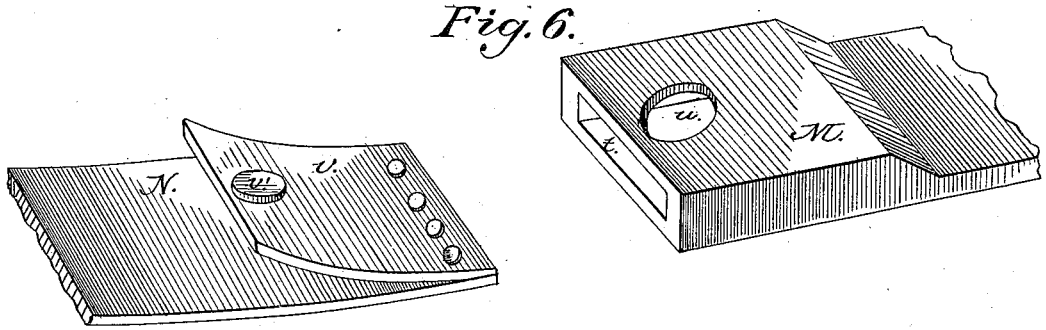
Fig. 6.
Fig. 7.
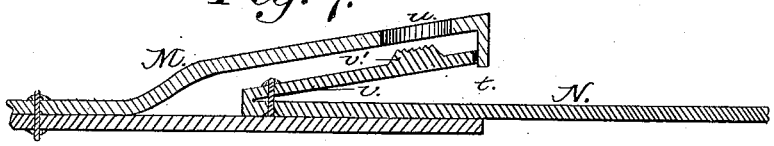
Witnesses: Inventors:

(No Model.) 4 Sheets—Sheet 4.
A. W. TOURGEE & L. DE F. JENNINGS.
HARNESS.
No. 333,175. Patented Dec. 29, 1885.
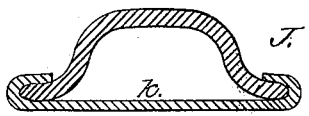
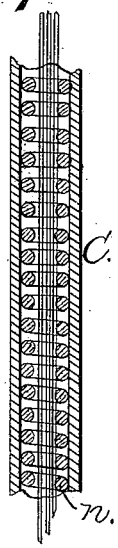
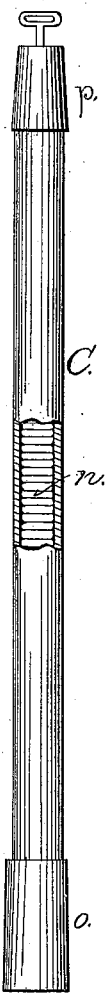
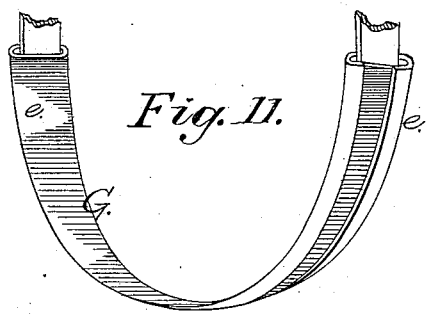
Witnesses: Inventors:

UNITED STATES PATENT OFFICE.

ALBION W. TOURGEE AND LINSON DE F. JENNINGS, OF MAYVILLE, N. Y.

HARNESS.

SPECIFICATION forming part of Letters Patent No. 333,175, dated December 29, 1885.

Application filed March 30, 1885. Serial No. 160,633. (No model.)

*To all whom it may concern:*

Be it known that we, ALBION W. TOURGEE and LINSON DE FORREST JENNINGS, citizens of the United States, residing at Mayville, in the county of Chautauqua and State of New York, have invented certain new and useful Improvements in Harness; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to novel and simplified improvements in the construction, arrangement, combination, and adjustment of the various parts of a harness, the object being to reduce the size and weight of the same; to promote simplicity of construction, ease and readiness of adjustment, cheapness, and effectiveness of the different parts, and a proper relation between the weight and strength of the various portions; to adapt the harness more completely to the form and comfort of the draft-horse; to promote the facility of construction and repair, readiness of adjustment and removal, certainty of operation, and security of adjustment, and to promote identity of construction and interchangeability of parts; and our improvements consist, essentially, of a harness formed of certain metallic devices and certain imperforate strips of leather or other flexible material united by certain metallic buckles or clasps without any chamfering, bending, sewing, or riveting of the said straps or other narrow flexible material, an important element of the said invention being that every part of each harness made upon the same pattern is susceptible of ready and instantaneous interchangeability without the use of any tool or mechanical appliance.

It further consists of certain details of construction and general arrangement of parts, all as will be hereinafter fully described, and pointed out in the claims.

Figure 1:
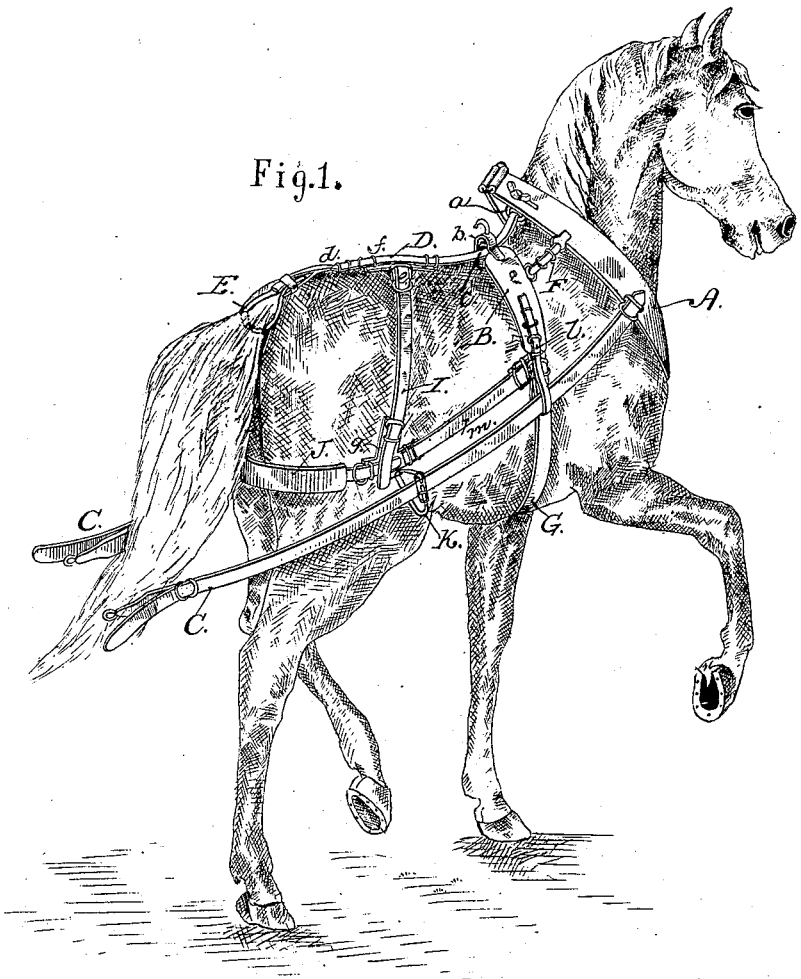
Figure 2:
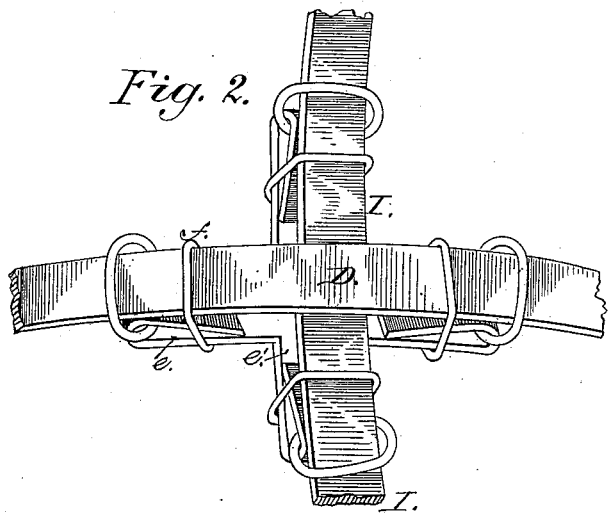
Figure 3:
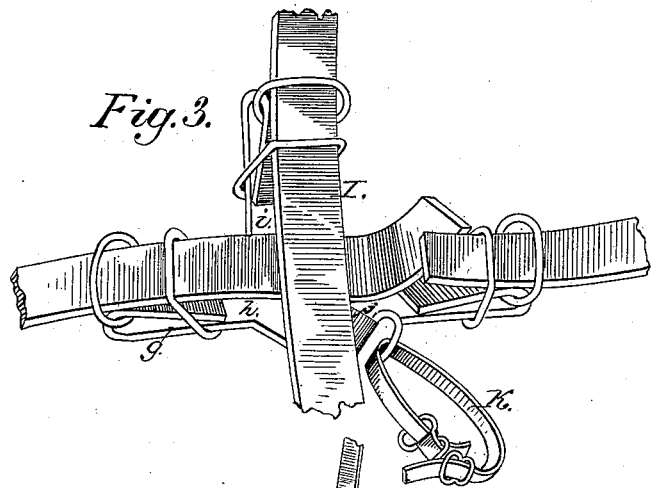
Figure 4:
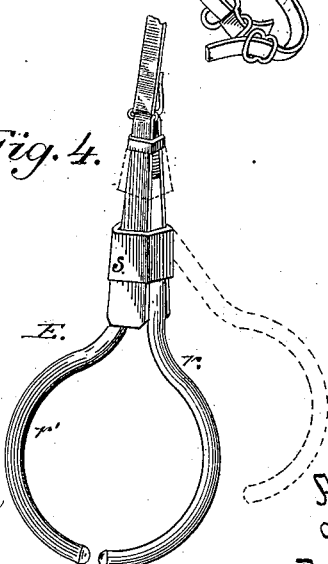

In the accompanying drawings, Figure 1 represents a perspective view of our complete harness as applied in position upon a horse, and Figs. 2 to 11 enlarged detail views thereof.

Similar letters of reference occurring on the several figures indicate corresponding parts.

In carrying out our improvements the combined collar and hames A, and the harness-saddle B, forming part of the complete harness, are composed of one or more metallic plates or layers arranged either parallel or in part separate from each other, and provided with suitable attachments for the connection and support of the other portions of the harness and the traction force, as fully set forth and described in separate applications for patent already made by us. The hame-collar A is so formed as to follow the convolutions of the shoulders of the draft-horse, its front or inner surface encircling the neck of the animal at about the precise point where the ordinary collar impinges against the shoulder of the same, and to said collar are affixed suitable devices, by which the tugs or traces C are attached and traction power applied. The said tugs or traces C are made of woven or braided metallic wire, forming a flexible core to be covered with leather, cloth, or other appropriate material, or used without such covering or decoration, the same being imperforate throughout their entire length, and adapted, by means of appropriate devices, to be attached to other portions of the harness and to the whiffletree without bending, perforating, sewing, or otherwise abrading any portion of said tugs or traces. The said hame-collar A is also adapted to be attached to the harness-saddle and other portions of the harness by means of the back-strap, D, which extends from the top of the said collar, to which it is attached by means of the buckle or clasp a, (said buckle or clasp forming the subject of a separate application for patent, already made by us) or other appropriate device, along the back of the animal, passing through or beneath the terret b of the harness-saddle, to which it is also connected by a buckle or clasp, c, of the character above referred to or by other suitable device to keep both the harness-saddle and the hame-collar in proper position and relation to each other at all times and under all circumstances. After passing through the said terret or saddle the said back-strap extends along the back of the draft-animal to the crupper E, to which it is attached by means of a buckle or clasp, $d$, of the character already referred to, the said back-strap D being throughout its whole length imperforate and requiring no stitching, chamfering, or bending in order to secure it in place or enable it to perform the offices of the back-strap of the ordinary harness. The hame-collar A is also preferably connected with the pad or saddle B by means of stay-straps F, one on each side, each of said stay-straps consisting of a flat or rounded core of braided wire covered with leather or other flexible material, and attached by suitable devices to the hame-collar A and extending backward over the shoulder of the horse on each side to the upper portion of the pad or saddle B, to which it is also secured by suitable devices, so as to retain said pad or saddle and the hame-collar in proper relations to each other under all circumstances.

Connecting with the harness saddle or pad B, and attached thereto by a suitable buckle or clasp, is a girth or belly-band, G, which is formed of an imperforate leather strap or strap of other narrow and flexible material, stiffened and strengthened in a greater part of its length by a metallic band, $e$, bent over the edges of the leather, as shown in Fig. 11, which serves at once to cause said girth to assume and retain its proper shape to prevent chafing or injury to the horse, as also to keep the girth from being drawn out of shape by weight thrown upon the holdback-strap or martingales.

The crupper E, which is connected with the back-strap by a clasp or buckle of the character heretofore alluded to, or other suitable device, is formed in two parts, $r$ $r'$, hinged together at their upper ends in such a manner that when the inferior points are brought together beneath the tail of the draft-animal a slide, $s$, upon the upper portion is slipped into position and retains the clasp about the tail, thereby securing the back-strap in position, and by means of the connections heretofore referred to and other suitable devices maintaining the different parts of the harness in proper position and suitable relation with each other. The said crupper may be either solid or hollow, of metal or other suitable materials, and may be covered with cloth or leather or other material desirable either for use or ornament. It differs from the ordinary crupper in that it consists of two symmetrical rigid surfaces hinged at the superior portion, retained in place by a sliding band, and susceptible of instant and convenient application or removable.

At the intersection of the back-strap and hip-straps I, or just above the hip of the draft-animal, is a compound buckle, $e$, made upon the principle of the buckle or clasp heretofore referred to, through which the back-strap passes, and which is held in place by the sliding ring $f$, as shown in Fig. 1. From either side of this compound buckle or clasp extends another one, $e'$, of the same character and at right angles thereto, as shown, to which is attached by means of the same or other suitable device the upper end of the hip-strap I. The whole of this buckle is covered with a metallic plate acting as a thimble for the ends of the hip-strap, and adding to the ornamental appearance as well as the efficiency of the harness. This differs from the ordinary junction of the back-strap and hip-strap in that the present back-strap is not sewed or in any manner attached directly to the hip-straps themselves, nor is any perforation of either back-strap or hip-strap necessary to effect their juncture or connection together, nor any chamfering or shaping of the ends, or reduction of the strength of said straps made, the metallic plate which constitutes the base of the compound buckle or clasp being preferably slightly raised at the edges to prevent any abrasion or chafing of the body of the draft-animal, and performing the office of the piece of leather ordinarily sewed upon a back-strap at the point of its intersection with the hip-strap, in order both to conceal the work and to prevent chafing. The hip-straps I extend from this junction with the back-strap down over each hip and flank to about the line extending through shoulder and flank, at which point, upon each side, it is connected with the breeching J by a compound buckle or clasp, $g$, of the character above indicated, consisting of three distinct parts, the one, $h$, of which attaches securely to the breeching, the other, $i$, of which receives the lower end of the hip-strap and the third, $j$, of which extends forward and downward to receive the free end of the holdback strap K, extending to the shaft on either side. This compound buckle or clasp $g$ extends for some distance above the breeching and in the direction of the back strap, at right angles with the breeching and along the direction of the back-strap, so as to serve the purpose of a divided brace-strap to which the hip-strap is ordinarily attached, and the use and purpose of which is to sustain the breeching in a horizontal position. This office is performed by means of the rigid compound buckle or clasp uniting the hip-strap and breeching and extending downward to the holdback-strap and connecting with the thill. The hip-straps of our improved harness differ essentially from the ordinary hip-strap in that ours are neither chamfered, narrowed, bent over upon themselves, or otherwise weakened in the connections made with other portions of the harness, that no brace-strap is necessary in connection therewith for the support of the breeching in a horizontal position, and, furthermore, in that they are united both to the back-strap and breeching by the self-locking clasps or buckles referred to, and may be attached or removed in an instant of time and without the use of any tool.

The breeching J of this harness is of the shape and general character of the same piece in the ordinary harness, and is designed to perform the same office. Instead, however, of being made of several thicknesses of leather united by sewing, riveting, or stamping, it is strengthened throughout nearly its whole length by a plate of metal, $k$, covering its inner surface, said plate being turned over at its edges upon one or more thicknesses of leather or other flexible material, which is preferably raised in the surface either by lateral compression or by a core placed underneath said material and between that and the lining metallic plate. The object of this metallic lining $k$ is to preserve the curved form of the breeching to prevent chafing or abrasion of the animal, to strengthen this portion of the harness, and prevent weakening and decay resulting from exposure to excremental fluids. It differs from the ordinary breeching or breech-pad in that it is imperforate throughout its whole extent, requires no stitches, chamfering, or shaping of the leather strap or other flexible material, and is united to the hip-strap, holdback-strap, and also, where desirable, to the side strap by means of the compound buckle or clasp already referred to and described in connection with the hip-strap. The holdback-strap of our harness also differs from the ordinary holdback-strap in that it is imperforate throughout its whole extent, does not require to be fitted, shaped, sewed, or punched in order to secure its adjustment either to the breeching or the thill, being attached to the former by the compound buckle or clasp uniting the back-strap to the breeching and extending forward and downward to the holdback-strap, which, after being wrapped around the thill, doubles upon itself and is again made fast to the said compound buckle or clasp by means of a separate sliding thimble attached thereto, as fully shown in the drawings.

Attached to the pad or side plate of the harness-saddle is a stirrup-strap, $l$, which is intended to support a thill-loop, and also afford a safe and easy bearing for the trace, and is secured in place by a buckle or clasp of the character before named, the upper part of which is hooded, in order to cover the free end of the stirrup-strap, and extending downward doubles inward upon itself, and is fastened in the proper position to permit the shaft to pass through by means of a compound buckle or clasp, the two portions of which are made in different planes. On the upper side of the stirrup-strap, and above the point where it is attached to itself, is also fastened another of said clasps or buckles, supporting at its lower extremity a metallic bearing, through which the tug or trace passes on its way from the hame-collar back to its connection with the side strap and whiffletree. The side strap, $m$, is united with the breeching by means of the compound clasp or buckle heretofore referred to, and extends forward in the same direction and performs the functions of the back-strap of the ordinary harness, the front end being attached to the trace-strap by means of a self-acting clasp or buckle just back of the girth. This stirrup-strap $l$ differs from the one in ordinary use in that it is imperforate throughout its whole extent, and does not require the adjustment to it of any separate band or loop made adjustable up and down its extent for the purpose of supporting the shaft or thill, as also in the fact that it is not bent, chamfered, riveted, shaped, or abraded in any manner to secure its adjustment, and has the metallic bearing-support for the trace separately connected therewith.

It will be observed that the trace or tug may be composed of a core of one or more metallic strands inclosed within a flexible cylinder, $n$, formed of coiled wire, as shown in Figs. 8 and 9, and the whole may be covered with leather or other flexible material, either to promote strength or ornament, one end of the trace or tug thus constructed being provided with a solid metallic cone, $o$, for engagement with the attaching devices upon the hame-collar A, while the opposite end of said trace or tug is provided with a suitable metallic clasp and hook, $p$, for engagement with the whiffletree.

The two parts or sections forming the collar A are united together at the top by a loop, P, passing through inclosing-shields $w$, secured to the tops of said sections, as fully shown in Fig. 5, while the lower ends of said sections are united by a spring latch or clasp, N, upon one section, engaging with a socket, M, upon the opposite section, a suitable opening, $t$, being provided in the end of said socket M for the entrance and withdrawal of the latch N. The projecting end of said latch N is provided with a spring-tongue, $v$, which is adapted to catch behind a projection upon the front of the socket M when the two parts are in operative relation with each other, a small opening, $u$, being made in the face of the socket M, through which pressure may be applied by the thumb upon the disk $v'$ of the spring-latch N to permit of the disengagement of said latch from the socket M, as fully shown in Figs. 6 and 7.

Having thus described our invention, we claim as new and useful—

1. The herein-described harness, consisting of the collar A and harness-saddle B, formed of metallic plates or layers provided with suitable devices for the attachment of other portions of the harness thereto, the imperforate back-strap D, having a metallic connection and adjustment with the breeching, collar, and harness-saddle, and provided with the bifurcated metallic crupper E, the imperforate breeching J, formed as described, and provided with the hip-straps I, holdback-straps K, and compound buckles $e$, $e'$, and $g$, the side straps, $m$, stirrup-straps $l$, and the stay-straps F, connecting the collar and harness-saddle, all substantially as and for the purpose specified.

2. A harness composed of a hame-collar, A, and harness-saddle B, formed of one or more metallic plates and provided with suitable attaching devices, a back-strap, D, breeching J, hip-straps I, holdback-straps K, and other connecting-straps imperforate throughout their entire extent and capable of attachment and adjustment by self-acting clasps and compound buckles, substantially as and for the purpose specified.

3. The combination of the stay-straps F with the hame-collar A and harness-saddle B, substantially as and for the purpose specified.

4. The traces C, imperforate throughout their entire length, composed of metallic core or lining, and provided with metallic connecting devices for attaching the same to other portions of the harness and to the whiffletree, substantially as specified.

5. The loop P, secured to the two parts or sections of the collar A by the overlapping shields w, substantially as and for the purpose described.

6. The spring latch N, provided with the tongue v and disk v', and the socket M, having openings t and u, in combination with the two parts or sections of the collar A, substantially as and for the purpose specified.

7. The belly-band or girth G, provided with an inner lining, e, formed of one or more metallic plates, the edges of which are bent or lapped over said band to secure the parts together, substantially as and for the purpose described.

In testimony whereof we affix our signatures in presence of two witnesses.

ALBION W. TOURGEE.
LINSON DE F. JENNINGS.

Witnesses:
T. D. BALDWIN,
J. B. DAVIS.